United States Patent

Teraoka

[15] 3,663,145
[45] May 16, 1972

[54] SYNTHETIC RESIN INJECTION MOLDING APPARATUS

[72] Inventor: Shoichi Teraoka, 2 of 3676 Kanmura-cho, Fukuyama, Hioshi Prefecture, Japan

[22] Filed: Dec. 26, 1968

[21] Appl. No.: 787,087

[52] U.S. Cl. ............................................. 425/250, 425/346
[51] Int. Cl. ........................................................ B29f 1/00
[58] Field of Search ............... 18/30 PP, 30 PU, 30 PQ, 16 PS, 18/43, 30 RP, 30 PM

[56] References Cited

UNITED STATES PATENTS

| 3,266,086 | 8/1966  | Markevitch | 18/43     |
|-----------|---------|------------|-----------|
| 2,570,433 | 10/1951 | Dodge      | 18/30 PU  |
| 3,132,381 | 5/1964  | Bowen      | 18/30 PU  |
| 3,464,091 | 9/1969  | Bielfeldt  | 18/30 PS  |
| 3,417,433 | 12/1968 | Teraoka    | 18/30 PP  |
| 2,476,558 | 7/1949  | Moxness    | 18/30 PU  |
| 3,063,092 | 11/1962 | Fischer    | 18/30 PP  |

FOREIGN PATENTS OR APPLICATIONS

| 567,681 | 8/1960 | Belgium | 18/30 PC |

*Primary Examiner*—Charles W. Lanham
*Assistant Examiner*—Michael J. Keenan
*Attorney*—Auslander & Thomas

[57] ABSTRACT

An injection molding apparatus comprising mold supporting plates to support molds on both sides, a group of molds having passages for plasticized material leading to cavities arranged on said fixed mold supporting plates, a clamping device provided with a movable mold platen to open and close said molds, and an injection device which may advance and retreat in the direction meeting at right angles with the opening and closing direction of said molds, in which plasticized material is injected into cavities, passing through said runner between said head and said molds and into said mold runner and T gate to said cavities.

4 Claims, 1 Drawing Figure

PATENTED MAY 16 1972
3,663,145
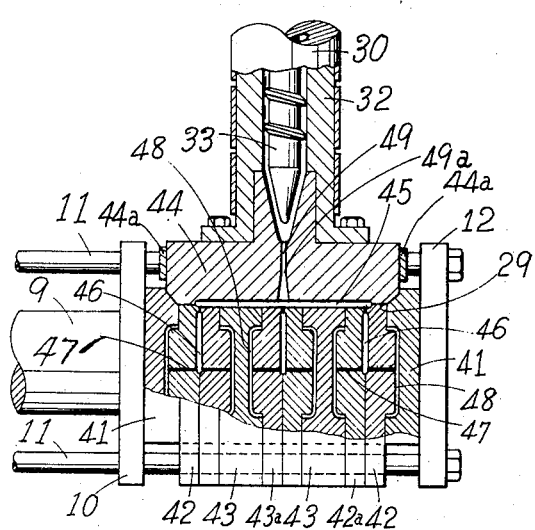
INVENTOR.
Shoichi Teraoka
BY

SYNTHETIC RESIN INJECTION MOLDING APPARATUS

This invention relates to injection molding machines for molding plastic articles, and more particularly, novel injection molding apparatus for manufacturing many molded articles at a stroke by providing passages for plasticized material communication with the cavity of each mold and also cavities of molds having the maxinum projected area moldable within the maximum range of the limited clamping force and its clamping stroke and by magnifying them a plurality of times.

Most of the conventional injection molding machines are so designed that both the mold clamping mechanism having a set of molds interposed between the movable mold platen and the fixed mold platen and the injection mechanism are arranged in alignment, and the injection nozzle is moved toward the back part of the mold or the opposite side to the clamping mechanism, passing through the said fixed mold platen, to eject plasticized material. In this case, it is a well-known fact that the maximum projected area moldable and the average pressure per unit area in the cavity of the mold, namely, a relative formula of $F \cdot P \cdot S \cdot 10^{-3}$ is set up, where $F$ (ton) being clamping force, $S$ (cm$^2$) being the maximum projected area moldable and $P$ (kg/cm$^2$) being the average pressure per unit area in the cavity. In the conventional injection molding, $P$ is 200 – 400 kg/cm$^2$ and this can be regarded to be nearly constant. However, each molded article has its own projected area and in cases where molded articles having a big projected area are manufactured, large clamping force correspoinding to such projected area is naturally required, irrespective of shot volume, thickness of molded articles, etc.

In the conventional molding method, in cases where the mold having the maximum projected area is provided within the range of the limited clamping force, if no more of molded articles than normal with such mold are to be manufactured, there is no other way but to increase special power resource and other working apparatus for quickening the molding cycle or to increase cavities. Also, it is self-evident that due to the restriction of clamping force on each molding machine, manufacturing of molded articles having a more projected area than normal with respective molding machine is absolutely impossible. If the cavity exceeding the clamping force slightly is employed, mold opening is caused by injection pressure, with the result of flash of molded articles. Such defects are caused by injecting plasticized material in a direction perpendicular to the plane including the projected area of mold. Since the projected area is plane, in cases where the intended molded articles are of flat shape, even if molds are piled up and clamped, so long as the conventional injection method is employed for injecting plasticized material perpendicularly to the plane including a cavity and making it reach the plane including other cavities, it is absolutely necessary to provide either a passage through which the plasticized material reach the next cavity by-passing the first cavity or a runner sprue passing through the plane including the first cavity. Moreover, such a method involves great difficulty in making molds.

As stated before, in the conventional injection molding machine the clamping force must be increased in proportion to the projected area. What is more important is that in the conventional injection molding machine having the flat cavity of big projected area, it has a disadvantage in that the stroke, shot volume, shot capacity, etc. of the clamping apparatus corresponding to such cavity leave a surplus, in other words, each function cannot be utilized effectively.

The present invention has for a principal object to provide an apparatus whereby many molded articles are obtained at a stroke by clamping a group of molds piled up in plural sets and by having the nozzle touch the said group of molds from a direction perpendicular to the said group of molds and inject into multi-cavities, thereby magnifying the projected area a plurality of times in the limited clamping force and thus displaying the injection capacity to the maximum possible extent. Another object of the present invention is to make many molded articles obtained in the limited clamping force superior and uniform in quality. Further object of the present invention is to mold many plastic articles in a shorter time and more economically. In order to realize the above-mentioned objects, the present invention provides a clamping apparatus to clamp a group of piled up molds, passages for plasticized material to distribute uniform injection pressure to each parting line of a group of molds, an injection means arranged at the side of the mold group to inject to the passages with uniform injection pressure, a means whereby injection nozzle is enable to maintain a proper temperature and injection pressure so as to make many molded articles superior and uniform in quality, pin-point gates or sprue gates within the mold so as to eliminate marks of sprue from molded articles, to enlarge injection pressure at the tips of heating and screw of injection means (because before plasticized material is filled in molds, there are cases where pressure is lost to some extent in the course of heating cylinder, nozzle, sprue runner gate or cavity).

In cases where plastic articles are injection-molded, various apparatuses are adopted according to clamping force, projected area, etc. to correspond to the shape of intended molded articles. Embodiments of the present invention according to uses are described below in reference to the accompanying drawings, in which:

The drawing is a plan view, partly in section, of the injection molding apparatus according to the present invention provided with a group of molds having six dish-like cavities.

In cases where plastic articles of dish-shape are manufactured in large quantities, mold apparatus as shown by the drawing may be used. A pair of mold mounting plates 10, 12 are provided respectively with the female portion 41 of the mold. The male portion 42 of the mold to correspond to the female portion 41 is supported at its peripheral part by the tie bar 11. Provided back to back with the two male portion 42 are the male portions 42a which are opposed to the female portions 43. Between the female portions 43 are provided two male portions 42, back to back with each other. Thus, six cavities in total are obtained with 10 molds. To the side of such group of molds, the nozzle head 44 is made to reciprocate from the direction which meets at right angles with the direction in which the group of molds opens and closes. The nozzle head 44 is T-shaped but forms a big runner 45 on the line which contacts with the concaved portion 29 for nozzle touching. Gates 46 are branched from the big runner 45 toward three small runners provided on two parting lines of the male portions 42 and 42a and a parting line of two male portions 43a. Each of these small runners branches at its tip into T-shaped gate 47 and is connected to respective cavity 48.

The above-mentioned big runner 45 hardens with the finish of injection due to cooling effect of the mold group side and at the same time as the nozzle head retreats and the group of molds is opened, it is cut at the central part 49a of the sprue and is discharged out of the mold. During this cycle, part of the remaining sprue 49 which was slightly cooled at the tip of the nozzle head, serves to check plasticized material from flowing out of the nozzle head but at the injection of the next cycle, it is melted fully by the heater 44a at the outer periphery of the nozzle head 44.

Various modifications of the present invention have been designed according to the shape or the degree of mass production of plastic articles, under the idea of the present invention, namely, clamping of a plurality of the group of molds piled up and injection from the side of the parting line of such molds, and do not depart from the conception of the present invention.

Having thus described the nature of my invention, what I claim is:

1. A plastic injection mold apparatus, having piled mold clamping means and piled mold releasing means including a plurality of male and female molds, said piled molds supported between said clamping means, said molds adapted to define a plurality of cavities, a plurality of runners between the parting lines of adjacent selected male molds, T-shaped gates branching from said male mold runners, said T-shaped gates leading to said cavities, and a plastic injection head including a sprue, said plastic injection head disposable substantially perpendicular to the plane of said mold cavities, said head and molds when clamped adapted to fit closely upon injection of plastics substantially without loss of plastic and forming an inner space between said head and said clamp molds, said space forming a runner substantially at a right angle to the runners between the parting lines of said male molds, said right-angle runner adapted to bypass each of said parting line runners.

2. The invention of claim 1 wherein said T-shaped gates open into approximately the center of said cavities.

3. The invention of claim 1 wherein said plastic injection head is heatable.

4. The invention of claim 1 wherein said T-shaped gates are pinpointed gates.

* * * * *